United States Patent [19]

Moss

[11] 4,216,197

[45] Aug. 5, 1980

[54] CONVERTING CALCIUM SULPHIDE TO CALCIUM OXIDE

[75] Inventor: Gerald Moss, Oxford, England

[73] Assignee: The United States of America as represented by the Administrator of the United States Environmental Protection Agency, Washington, D.C.

[21] Appl. No.: 953,147

[22] Filed: Oct. 17, 1978

Related U.S. Application Data

[63] Continuation of Ser. No. 876,100, Feb. 8, 1978, abandoned, which is a continuation of Ser. No. 678,580, Apr. 20, 1976, abandoned.

[51] Int. Cl.$^2$ .............................................. C01F 11/10
[52] U.S. Cl. .................................................... 423/638
[58] Field of Search ................ 423/541, 542, 638, 539

[56] References Cited

U.S. PATENT DOCUMENTS

| | | | |
|---|---|---|---|
| 3,582,276 | 6/1971 | Campbell et al. ..................... 423/539 |
| 3,807,090 | 4/1974 | Moss ................................... 23/288 S |
| 4,102,989 | 7/1978 | Wheelock ............................. 423/638 |

Primary Examiner—O. R. Vertiz
Assistant Examiner—Wayne A. Langel

[57] ABSTRACT

CaS is converted to CaO with increased production of SO$_2$ and decreased production of CaSO$_4$ by passing CaS-containing particles into one region of a conversion bed wherein they are fluidized at an elevated temperature by an upwardly-passing oxygen-containing fluidizing gas, removing particles of increased CaO content from a second region of the bed, and providing a reducing agent (e.g. a hydrocarbon gas, liquid or carbonaceous solid) in the bed between the first and second regions, preferably nearer the latter, to produce a mildly reducing atmosphere which reduces any CaSO$_4$ and increases the yield of SO$_2$. The removed particles may be circulated to a fluidized gasification bed wherein a sulphur-containing fuel is converted to substantially sulphur-free fuel gas and wherein the sulphur is fixed as CaS in the particles, which particles are thereafter recirculated to the conversion bed.

7 Claims, 2 Drawing Figures

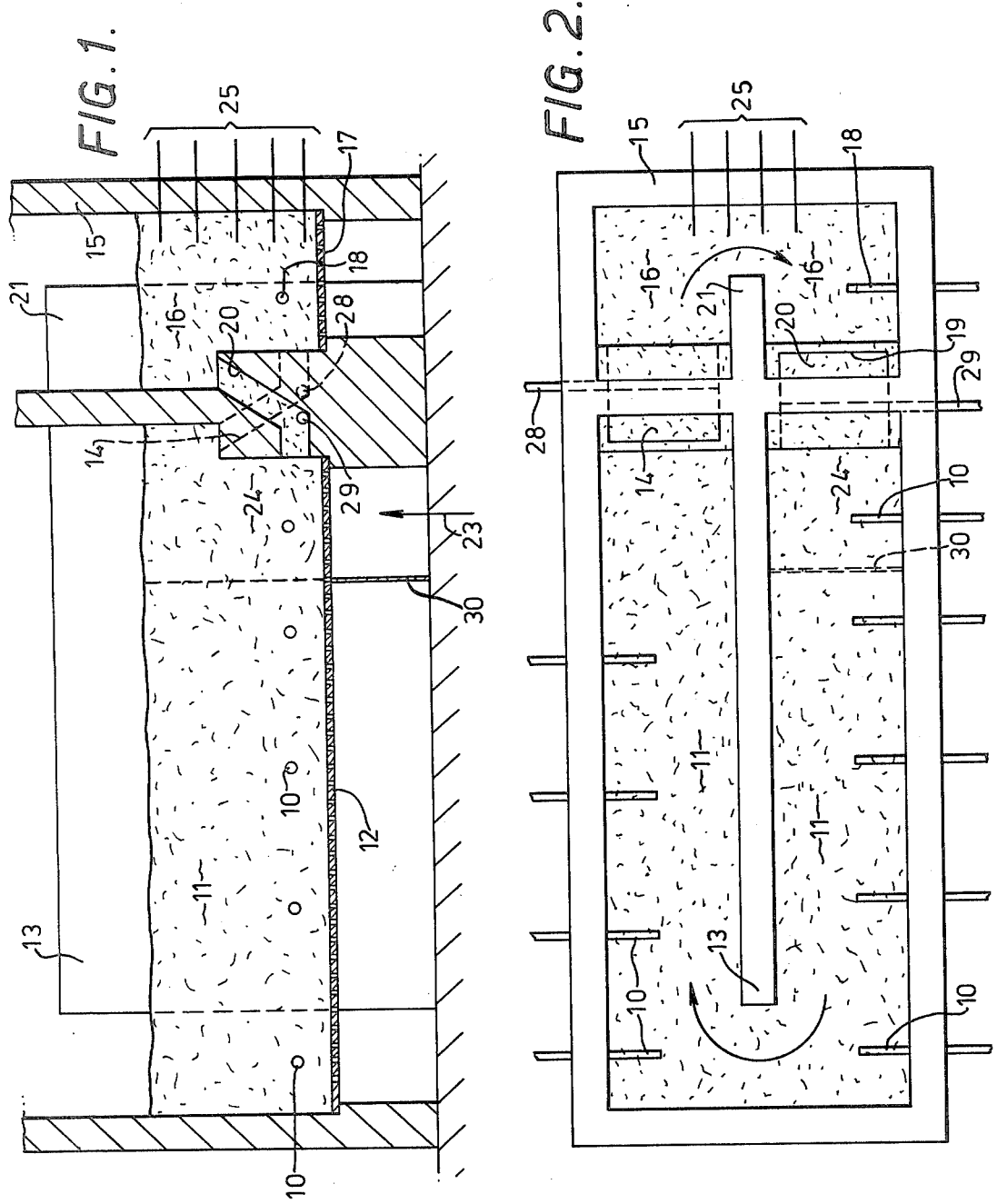

CONVERTING CALCIUM SULPHIDE TO CALCIUM OXIDE

BACKGROUND AND SUMMARY OF THE INVENTION

The present invention relates to converting calcium sulphide (CaS) to calcium oxide (CaO), and was made in the course of work performed under a Contract with the U.S. Environmental Agency.

This is a continuation of application Ser. No. 876,100, filed Feb. 8, 1978, now abandoned which was a continuation of application Ser. No. 678,580, filed Apr. 20, 1976, now abandoned.

CaS is produced, inter alia, during the desulphurization of fuels and gases containing sulphur compounds which react with CaO or thermal precursors thereof, such as $CaCO_3$ or mixed carbonates such as dolomite (approximately $MgCO_3$, $CaCO_3$). In order to avoid a major disposal problem, it has been proposed to convert the CaS back to CaO for re-use in desulphurization. This may be done by exposing the CaS to an oxygen-containing gas (e.g. air). Preferably the CaS-containing material is in the form of particles which are fluidized by the oxygen-containing gas, hereinafter referred to as air or brevity.

If the air rate is low relative to the concentration of CaS, not all the CaS is converted and the overall sulphur content of the particles undergoing conversion tends to increase. The CaS which is converted, however, is almost wholly converted to CaO, rather than $CaSO_4$, and the sulphur is liberated as sulphur oxides, predominantly $SO_2$. As a result, if the particles are employed in a cyclic process in which, in the other part of the cycle, the treated particles are employed for desulphurization, there will be a build-up in the sulphur content of the circulating particles which will influence the efficacy of the particles for fixing sulpur in the desulphurizing stage. In most instances, an equilibrium will be attained at a relatively high circulating sulphur content in which the amount of sulphur fixed during desulphurization will be balanced by the amount of sulphur released as oxides in the conversion stage.

If the air rate is high relative to the concentration of CaS, an increased proportion of the CaS is converted to $CaSO_4$, less $SO_2$ being liberated and less CaO formed, i.e. the selectivity of conversion to CaO is reduced. An equilibrium sulphur content is established at a lower overall level than in the case wherin the air rate is relatively low. In both cases, the conversion temperature is influenced by the rate of input to, and removal of particles from, the conversion bed since the particles act as a heat transfer agent.

In the present invention, in one aspect the low average sulphur content of the particles obtained at relatively high air rates is combined with the relatively high selectivity of conversion of CaS to CaO obtained at relatively low air rates by providing at least sufficient air to convert CaS to CaO and providing a reducing agent in the region of the conversion zone where the $CaSO_4$ concentration in the treated particles tends to be highest.

In another aspect, CaS-containing particles are passed into a first region of the conversion zone for conversion to CaO and particles are transferred out of, or removed from, a second region of the conversion zone, the particles being fluidized, e.g. in a bed, in the conversion zone by air, and a reducing agent is provided in the second region of the conversion zone to reduce $CaSO_4$ and preferably to react with any excess air which might convert CaS to $CaSO_4$. In a preferred embodiment CaS-containing particles are passed into, or near to, the bottom of the first region, and treated or converted particles are removed or transferred out from the top, or from near to the top, of the second region. The first and second regions are preferably in different vertical planes and are preferably separated by a vertical wall which causes particles to circulate in a generally upwardly extending path which is 'U'-shaped in horizontal cross-sections.

The reducing agent may be a liquid, solid or gas and in the instance where the CaS is produced in the desulphurizing of a sulphur-containing fuel, such as fuel oil, it may be convenient to use some of the sulphur-containing fuel as the reducing agent. The reducing agent preferably should be provided in an amount such that the air in the second region will be about 55% of that required for the complete combustion of the fuel. The reducing agent will increase the selectivity of conversion of CaS to CaO, and the yield of liberated sulphur and sulphur compounds will be increased while the proportion of $CaSO_4$ will be reduced in the particles leaving the conversion zone. The formation of $CaSO_4$ from CaS is highly exothermic, while the provision of a reducing agent in the second region will tend to reduce temperatures in the second region of the conversion zone and make them more uniform.

When CaO is employed to desulphurize sulphur-containing fuels, the fuels are preferably injected into a bed of particles comprising CaO maintained at a temperature of from 800° to 1100° C., the particles being fluidized by air, (e.g. at a stoichiometric rate of 15% to 30% relative to the fuel) for gasifying the fuel. Particles containing CaS are passed to the conversion zone, and treated as above described, and the treated particles are returned to the fuel desulphurization zone. The temperature in the conversion zone will tend to be higher (e.g. 1050° to 1090° C., preferably 1060°–1080° C.) than the preferred range of temperatures (850°–880° C.) in the fuel desulphurization zone. Thus, the particles transferred into the conversion zone tend to reduce the temperature of the latter particularly in the first region thereof, while the transfer of particles in the reverse direction tends to increase the temperature of at least the part of the desulphurization zone to which the treated particles are transferred. Since an excessively high temperature tends to reduce the efficiency of fuel desulphurization, it is preferred to cool the particles entering the fuel desulphurizing zone by means of a heat sink material, such may be cooled flue gas (e.g. obtained by burning and cooling some of the gasified fuel) and-/or water or steam and/or fresh particles (e.g. as $CaCO_3$).

In order to ensure that sulphur fixed in the particles as CaS during the desulphurization step is removed as substantially the same rate during the conversion step, it is preferred to circulate particles between the sulphur-fixing zone and conversion zone at a rate which is related to the sulphur content of the particles transferred from the fixing zone to the conversion zone. The sulphur content will determine the temperature in the conversion zone (since the conversion is exothermic overall), and because the temperature in the conversion zone will vary from relatively cool (e.g. 860° C.) at the first region, to relatively hotter (e.g. 1090° C.) between the first and second regions, and relatively cooler (e.g. 1060° C.) in the second region, the rate of circulation of particles is preferably determined by the temperature of the hotter or hottest parts of the conversion zone. Since the location of the hotter and hottest parts may change with the concentration of sulphur (as sulphur compounds), a preferred means for regulating the circulation is to provide in the regenerator a number of temperature sensors (e.g. thermocouples), preferably arranged in a linear array, and to arrange matters so that the temperature sensor registering the highest temperature controls the particle transfer rate.

BRIEF DESCRIPTION OF THE DRAWINGS

In the accompanying drawing,

FIG. 1 is a diagrammatic side view of a non-limitative example of equipment embodying the invention and FIG. 2 is a diagrammatic plan view of same.

DESCRIPTION OF THE PREFERRED EMBODIMENTS

Sulphur-containing fuel oil is injected through injectors 10 into a bed 11 comprising particles of CaO. The particles are fluidized by air upwardly passed through the bed from a distributor 12 and the fuel is converted to fuel gas at a bed temperature of c. 860° C. As will be seen from FIG. 2, the bed space 11 is divided by a septum 13 and particles travel around the bed space in a clockwise (as shown in FIG. 2) direction, as indicated by the arrows, from an entry end to an exit end. At the exit end, particles pass into a downsloping downcomer 14 into the bottom region of a regenerator 15 containing a bed 16 of particles which are fluidized by air which is upwardly passed from a distributor 17. In the regenerator bed 16, the CaS of the particles is converted to CaO with the liberation of $SO_2$ and the generation of some $CaSO_4$. The concentration of $CaSO_4$ and the particle temperature is reduced by injecting hydrocarbon oil into bed 16 from an injector 18 (shown only in FIG. 2) adjacent to an exit port 19 forming the entrance to a downsloping downcomer 20 (FIG. 1) which passes the particles to the entry end of the bed 11. A septum 21 extends between the inlet and outlet of the bed 16 to promote clockwise particle flow (as shown in FIG. 2). Transfer of particles through the downcomers 14 and 21 is promoted by pulses of gas (e.g. nitrogen or air) directed into the horizontal discharge section of each downcomer from respective gas pulse conduits 28, 29. The particles are conveyed pneumatically from the downcomers into the beds by the gas pulses. The particles at the entry region 24 of the bed 11 are cooled by fluidization with cool recycled flue gas (indicated by arrow 23 in FIG. 1) obtained from the combustion and cooling of the fuel gas produced in the bed 11 and/or by the addition of cool heat absorbing particles, such as cold calcinable particles to region 24 (FIG. 2) e.g. from an overhead hopper and feed regulating device (not shown). It is preferred to separate the main air flow into the bed 11 from the recycled flue gas (which may contain admixed air) by means of a vertical partition 30 in the space beneath the distributor 12. The rate of transfer of particles between the beds is regulated by the temperature of the hotter or hottest thermocouple(s) of a bank 25 of thermocouples (FIG. 2) in the regenerator bed 16 the thermocouples acting via amplifiers on a bed transfer control system comprising the conduits 28, 29. Further temperature control in the bed 11 may be obtained by diluting the fluidizing air with an inert material such as recycled flue gas (obtained by burning the fuel gas) and/or steam and/or water. The mean temperature in the bed 16 is about 1065° C. to 1075° C.

What we claim is:

1. A method of selectively converting calcium sulfide to calcium oxide by horizontally circulating flow of calcium sulfide-containing particles through a single fluidized conversion bed, comprising treating particles containing calcium sulfide at temperatures in an elevated selective conversion temperature range in a single fluidized conversion bed wherein the particles are substantially uniformly fluidized by passing an oxygen-containing gas substantially uniformly into the bottom of the fluidized conversion bed, the calcium sulfide-containing particles being passed into the bed from an entrance at an upstream end of the bed, and treated particles being discharged from a downstream region of the bed via an exit at the downstream end of the downstream region, the exit being horizontally separated from the entrance whereby the discharge to particles via the exit causes a horizontal circulation of particles through the fluidized conversion bed, the mol ratio of oxygen to calcium sulfide at least in regions contiguous with the entrance being such as to cause substantially selective conversion of calcium sulfide to calcium oxide with the liberation of sulfur dioxide and the evolution of heat which maintains the temperature of the particles in the said contiguous regions substantially within the said selective conversion range whereby particles circulating into the downstream region have a calcium sulfide content which is too low in relation to the oxygen supplied to the downstream region for the selective conversion of calcium sulfide to calcium oxide, and adding a regulated amount of reducing agent other than calcium sulphide in the downstream region to react with oxygen therein and thereby cause the mol ratio of oxygen to calcium sulfide to be such that substantially selective conversion of calcium sulfide to calcium oxide takes place with the liberation of sulfur dioxide and the evolution of heat maintaining the temperature of the particles in the downstream region substantially within the said selective temperature range, whereby the particles discharged from the exit contain calcium oxide which has been substantially selectively converted from calcium sulfide in the fluidized conversion bed.

2. A method according to claim 1 in which the CaS-containing particles are passed substantially continuously into a bottom part of the upstream region and the treated calcium oxide-containing particles are removed substantially continuously from a top part of the downstream region.

3. A method according to claim 2 in which the upstream region and the downstream region are in different vertical planes.

4. A method according to claim 3 in which the upstream and downstream regions are partly defined by vertical baffle means between the regions.

5. A method according to claim 1 in which the reducing agent is provided in an amount such that the oxygen in the downstream region will provide about 55% of that required for complete combustion of the reducing agent.

6. A method according to claim 1 in which the said elevated selective conversion temperature range is from 1050° C. to 1090° C.

7. A method according to claim 1 in which the treated calcium oxide-containing particles are circulated to one region of a fluidized gasification bed wherein they are fluidized by an upwardly passing oxygen-containing gas and wherein a sulphur-containing fuel is partly combusted in contact with the particles to produce a substantially sulphur-free fuel gas, sulphur from the fuel being fixed as CaS in the particles, calcium sulfidecontaining particles being removed from another region of the fluidized gasification bed and circulated to the fluidized conversion bed.

* * * * *